US011421999B2

United States Patent
Mack et al.

(10) Patent No.: US 11,421,999 B2
(45) Date of Patent: Aug. 23, 2022

(54) ROUTE SELECTION USING CORRECTION FACTORS INDICATING PHASE INTERRUPTIBLE TRAFFIC SIGNALS

(71) Applicant: Global Traffic Technologies, LLC, St. Paul, MN (US)

(72) Inventors: Chad Mack, Durand, WI (US); Gayathri Natesan, Oakdale, MN (US)

(73) Assignee: Global Traffic Technologies, LLC, St. Paul, MN (US)

( * ) Notice: Subject to any disclaimer, the term of this patent is extended or adjusted under 35 U.S.C. 154(b) by 0 days.

(21) Appl. No.: 16/918,522

(22) Filed: Jul. 1, 2020

(65) Prior Publication Data

US 2022/0003562 A1 Jan. 6, 2022

(51) Int. Cl.
*G01C 21/34* (2006.01)
*G08G 1/01* (2006.01)
*G08G 1/082* (2006.01)
*G08G 1/087* (2006.01)
*G01C 21/36* (2006.01)

(52) U.S. Cl.
CPC ..... *G01C 21/3461* (2013.01); *G01C 21/3492* (2013.01); *G01C 21/3667* (2013.01); *G08G 1/0137* (2013.01); *G08G 1/082* (2013.01); *G08G 1/087* (2013.01)

(58) Field of Classification Search
CPC ............ G01C 21/3461; G01C 21/3492; G01C 21/3667; G08G 1/0137; G08G 1/082; G08G 1/087
See application file for complete search history.

(56) References Cited

U.S. PATENT DOCUMENTS

| 8,700,299 | B2 * | 4/2014 | Morita ............. | G08G 1/096716 |
| | | | | 701/123 |
| 10,365,115 | B2 * | 7/2019 | Nair .................... | G01C 21/3492 |
| 2004/0196162 | A1 | 10/2004 | Brooke | |
| 2005/0104745 | A1 | 5/2005 | Bachelder et al. | |
| 2005/0187701 | A1 * | 8/2005 | Baney .............. | G08G 1/096716 |
| | | | | 701/117 |

(Continued)

OTHER PUBLICATIONS

USPTO/ISA. International Search Report and Written Opinion dated Oct. 4, 2021 for related international application of the common Applicant, PCT Application Serial No. PCT/US2021/039676, 12 pgs.

(Continued)

*Primary Examiner* — Hussein Elchanti
(74) *Attorney, Agent, or Firm* — Crawford Maunu PLLC (57) ABSTRACT

Disclosed approaches for selecting a travel route involve considering phase interruptibility of traffic signals on alternative routes. Multiple alternative routes are determined in response to a request for a route. Information describing each route specifies a set of road segments, a set of intersections, and estimated travel times on the road segments. For each road segment that connects to an intersection having a phase-interruptible traffic signal, the estimated travel time on the segment is reduced based on a correction factor associated with the intersection. Estimated travel times on the alternative routes are determined based on the reduced estimated travel times on the segments. One or more of the alternative routes are displayed, including a visual indication of the route having the least estimated travel time.

26 Claims, 5 Drawing Sheets

(56) References Cited

U.S. PATENT DOCUMENTS

| | | | | |
|---|---|---|---|---|
| 2009/0167561 | A1* | 7/2009 | Liang | G08G 1/0104 340/907 |
| 2009/0287401 | A1* | 11/2009 | Levine | G08G 1/0141 701/117 |
| 2010/0030458 | A1* | 2/2010 | Coughlin | B60W 40/09 701/123 |
| 2010/0045484 | A1* | 2/2010 | Brynielsson | G08G 1/087 340/906 |
| 2010/0082190 | A1* | 4/2010 | Jinno | B60K 6/543 701/22 |
| 2010/0171640 | A1* | 7/2010 | Delia | G08G 1/07 340/907 |
| 2010/0280748 | A1 | 11/2010 | Mundinger et al. | |
| 2010/0308986 | A1* | 12/2010 | Dobryden | G08C 17/02 340/438 |
| 2011/0043348 | A1* | 2/2011 | Blackard | F16H 63/42 340/439 |
| 2011/0126797 | A1* | 6/2011 | Russell | F02D 19/0692 123/294 |
| 2014/0336913 | A1* | 11/2014 | Fino | G08G 1/096844 701/117 |
| 2015/0145995 | A1* | 5/2015 | Shahraray | H04L 67/12 348/148 |
| 2016/0148507 | A1* | 5/2016 | Pittman | G06Q 30/0255 340/917 |
| 2016/0358463 | A1* | 12/2016 | Cho | G08G 1/04 |
| 2017/0154525 | A1* | 6/2017 | Zou | G08G 1/08 |
| 2017/0353350 | A1* | 12/2017 | Gussen | H04B 10/11 |
| 2018/0075739 | A1* | 3/2018 | Ginsberg | G08G 1/0145 |
| 2018/0143628 | A1* | 5/2018 | Samper | B60W 50/12 |
| 2018/0151064 | A1* | 5/2018 | Xu | G08G 1/0116 |
| 2018/0253968 | A1* | 9/2018 | Yai | G08G 1/097 |
| 2018/0286228 | A1* | 10/2018 | Xu | G08G 1/0112 |
| 2018/0286245 | A1* | 10/2018 | Obaidi | G08G 1/096775 |
| 2019/0251838 | A1* | 8/2019 | Bernhardt | G08G 1/096822 |
| 2019/0272747 | A1* | 9/2019 | Raamot | G08G 1/08 |
| 2020/0334979 | A1* | 10/2020 | Gon | H04B 1/59 |
| 2021/0204188 | A1* | 7/2021 | Oyama | G08G 1/096725 |

OTHER PUBLICATIONS

Shaaban et al. "A Strategy for Emergency Vehicle Preemption and Route Selection" Arabian Journal for Science and Engineering, pp. 8905-8913, May 17, 2019.

* cited by examiner

ROUTE SELECTION USING CORRECTION FACTORS INDICATING PHASE INTERRUPTIBLE TRAFFIC SIGNALS

FIELD OF THE INVENTION

The present invention is generally directed to determining a recommended route from a source to a destination based in part which intersections have phase interruptible traffic signals.

BACKGROUND

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have in the past typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle. To ensure safe passage through a red signal, emergency responders are trained to stop at every red light to confirm no traffic is approaching prior to proceeding through the intersection.

Traffic control preemption systems assist authorized vehicles (police, fire and other public safety or transit vehicles) through signalized intersections by making a preemption request to the intersection controller. The controller will respond to the request from the vehicle by changing the intersection lights to green in the direction of the approaching vehicle or extending the green phase of a traffic light. This system improves the response time of public safety personnel, while reducing dangerous situations at intersections when an emergency vehicle is trying to cross on a red light. In addition, speed and schedule efficiency can be improved for transit vehicles. As used herein, traffic signal "preemption" will refer to both changing a traffic signal from red to green and to extending the green phase of a traffic signal in response to signals from emergency vehicles and transit vehicles.

There are presently a number of known traffic control preemption systems that have equipment installed at certain traffic signals and on authorized vehicles. One such system in use today is the OPTICOM® system. This system utilizes a high power strobe tube (emitter), located in or on the vehicle, that generates light pulses at a predetermined rate, typically 10 Hz or 14 Hz. A receiver, which includes a photo detector and associated electronics, is typically mounted on the mast arm located at the intersection and produces a series of voltage pulses, the number of which are proportional to the intensity of light pulses received from the emitter. The emitter generates sufficient radiant power to be detected from over 2500 feet away.

Intensity levels are associated with each intersection approach to determine when a detected vehicle is within range of the intersection. Vehicles with valid security codes and a sufficient intensity level are reviewed with other detected vehicles to determine the highest priority vehicle. Vehicles of equivalent priority are selected in a first come, first served manner. A preemption request is issued to the controller for the approach direction with the highest priority vehicle travelling on it.

Another common system in use today is the OPTICOM® GPS priority control system. This system utilizes a GPS receiver in the vehicle to determine location, speed, and heading of the vehicle. The information is combined with security coding information that consists of an agency identifier, vehicle class, and vehicle ID and is broadcast via a proprietary 2.4 GHz radio.

An equivalent 2.4 GHz radio located at the intersection along with associated electronics receives the broadcasted vehicle information. Approaches to the intersection are mapped using either collected GPS (Global Positioning System) readings from a vehicle traversing the approaches or using location information taken from a map database. The vehicle location and direction are used to determine on which of the mapped approaches the vehicle is approaching toward the intersection and the relative proximity to it. The speed and location of the vehicle are used to determine the estimated time of arrival (ETA) at the intersection and the travel distance from the intersection. ETA and travel distances are associated with each intersection approach to determine when a detected vehicle is within range of the intersection and, therefore, a preemption candidate. Preemption candidates with valid security codes are reviewed with other detected vehicles to determine the highest priority vehicle. Vehicles of equivalent priority are generally selected in a first come, first served manner. A preemption request is issued to the controller for the approach direction with the highest priority vehicle travelling on it.

With metropolitan-wide networks becoming more prevalent, additional means for detecting vehicles via wired networks such as Ethernet or fiber optics and wireless networks such as Mesh or IEEE 802.11b/g may be available. With network connectivity to the intersection, vehicle tracking information may be delivered over a network medium. In this instance, the vehicle location is either broadcast by the vehicle itself over the network or it may broadcast by an intermediary gateway on the network that bridges between, for example, a wireless medium used by the vehicle and a wired network on which the intersection electronics resides. In this case, the vehicle or an intermediary reports, via the network, the vehicle's security information, location, speed, and heading, along with the current time. Controllers at intersections and connected to the network receive the vehicle information and evaluate the position using approach maps as described in the OPTICOM® GPS system. The security coding could be identical to the OPTICOM® GPS system or employ another coding scheme.

SUMMARY

A disclosed method includes determining by a computing arrangement in response to a request for a recommended route, a plurality of different routes from a source to a destination. Each route is defined by a set of road segments, a set of intersections, and data indicative of first estimated travel times on the road segments, respectively. The computing arrangement reduces the first estimated travel times based on one or more correction factors, for one or more road segments of the different routes that connect to one or more intersections having phase-interruptible traffic signals. The computing arrangement determines second estimated travel times of the different routes as a function of the first estimated travel times and reduced ones of the first estimated travel times. One or more routes of the different routes are displayed on a display device, and a visual indication is provided for one route of the one or more routes having a second estimated travel time that is less than the second estimated travel time of every other route of the one or more routes.

According to a disclosed system, a portable computing device has one or more processors and a memory configured with program instructions that when executed cause the one or more processors to request and receive from a server, a plurality of different routes from a source to a destination. Each route is defined by a set of road segments, a set of intersections, and data indicative of first respective estimated travel times on the road segments. The portable computing device reduces the first respective estimated travel times based on one or more correction factors, for one or more road segments of the different routes that connect to one or more intersections having phase-interruptible traffic signals. The portable computing device determines second estimated travel times of the different routes as a function of the first estimated travel times and reduced ones of the first estimated travel times. The portable computing device displays one or more of the different routes on a display device and provides a visual indication of one route of the one or more routes having a second estimated travel time that is less than the second estimated travel time of every other route of the one or more routes.

Another disclosed system includes a server that has one or more processors and a memory configured with program instructions that when executed cause the one or more processors to receive from a communicatively coupled portable computing device, a request for directions from a source to a destination. The server requests and receives from a real-time mapping server, a plurality of different routes from the source to the destination. Each route is defined by a set of road segments, a set of intersections, and data indicative of first respective estimated travel times on the road segments. The server reduces the first respective estimated travel times based on one or more correction factors, for one or more road segments of the different routes that connect to one or more intersections having phase-interruptible traffic signals. The server determines second estimated travel times of the different routes as a function of the first respective estimated travel times of the road segments and reduced ones of the first estimated travel times. The server communicates to the portable computing device, information that describes one or more routes of the different routes on a display device and that indicates one route of the one or more routes having a second estimated travel time that is less than the second estimated travel time of every other route of the one or more routes.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Determining a route that requires the least amount of time to travel from a current location to a destination can be critical for police, firefighters, paramedics and other responders to emergencies. A delay of seconds or minutes can mean a difference between saving and losing a life. Emergency responders sometimes use the same mapping tools that civilians use to map a route. For example, the prevalence of smart phones has enabled applications such as Google Maps and Waze.

Current approaches to selecting a route are tailored to travel by private vehicle, and the recommended route may be less than optimal for an emergency vehicle. That is, among a number of alternative routes, one route may be judged to be optimal for a private vehicle. However, an emergency vehicle may travel on an alternative route in less time, because emergency vehicles have access to equipment that can reduce travel times by interrupting normal phases of traffic signals. The phase interruption equipment is generally unavailable to private vehicles.

Current tools for selecting a route evaluate factors such as speed limits, distances, current traffic speeds, current traffic congestion, and crash locations in comparing alternative routes. Without accounting for traffic signals that are phase interruptible, emergency responders cannot be assured that there is not an alternative route on which the travel time could be less than the travel time on the recommended route. That is, the travel time on the recommended route might be greater than the travel time on an alternative route, because the route selection tool did not consider the presence of phase-interruptible traffic signals.

According to the disclosed methods and systems, route selection can be improved by way of determining on alternative routes those intersections that have phase-interruptible traffic signals. The travel time on a route can be reduced according to the number, placement, and capabilities of phase-interruptible traffic signals on the route. In evaluating alternative routes and selecting one of the routes to recommend, the methods and systems factor-in the presence of phase-interruptible traffic signals.

Figure 1:
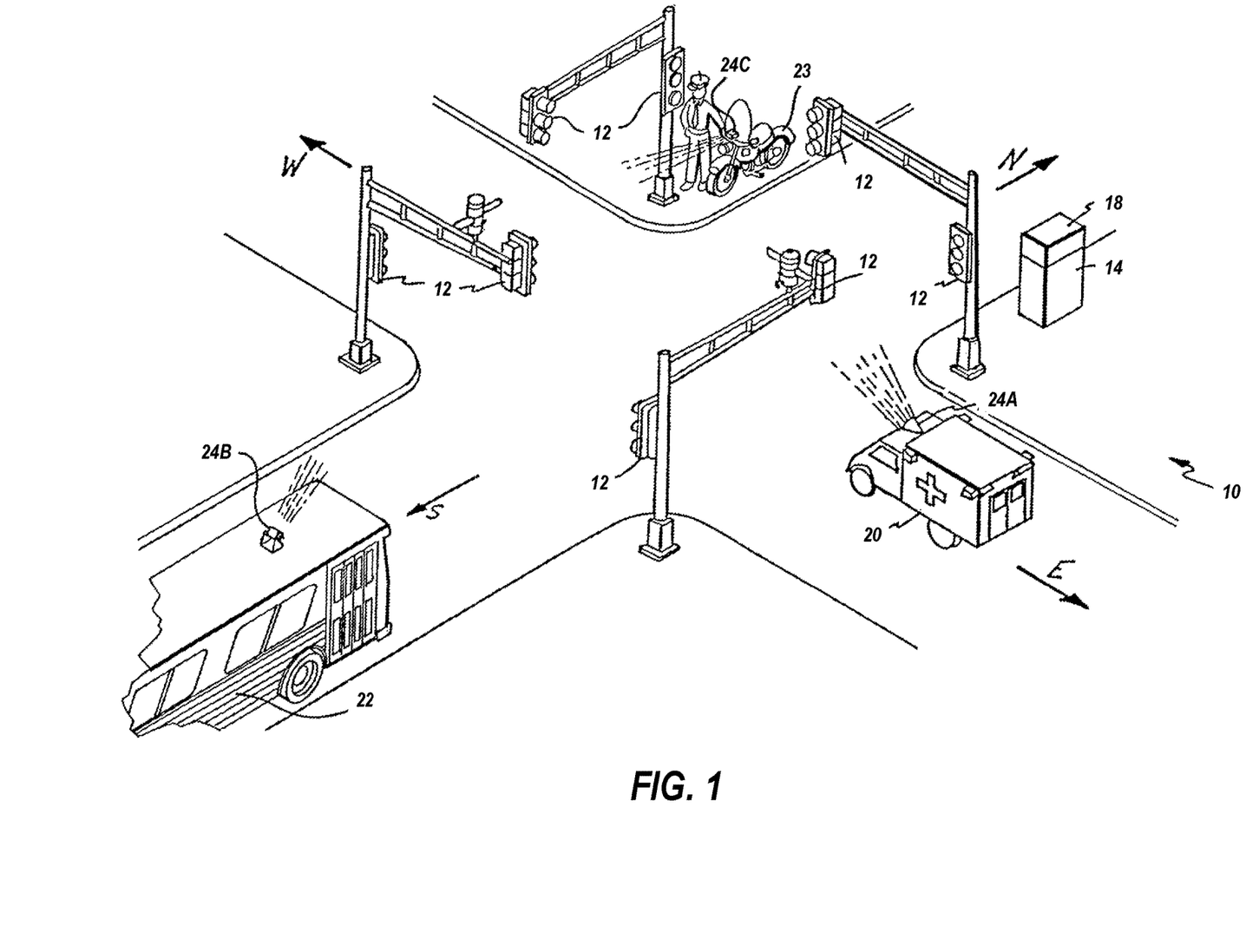
FIG. 1 is an illustration of a typical intersection having traffic signal lights.

FIG. 1 is an illustration of a typical intersection 10 having traffic signal lights 12. The equipment at the intersection illustrates the environment in which the disclosed approaches can be used. A traffic signal controller 14 sequences the traffic signal lights 12 to allow traffic to proceed alternately through the intersection 10. The intersection 10 can have equipment that is connected to a network through which preemption requests are conveyed.

The traffic control preemption system shown in FIG. 1 includes signal emitters 24A, 24B and 24C (also referred to herein as "vehicle control units"), a traffic signal controller 14, and a phase selector 18. In FIG. 1, an ambulance 20 and a bus 22 are approaching the intersection 10. The signal emitter 24A is mounted on the ambulance 20 and the signal emitter 24B is mounted on the bus 22. The signal emitters 24A and 24B can transmit location messages to a server (not shown).

The server can transmit messages to the phase selector 18. The phase selector can process received messages to determine security codes. Each security code can indicate the vehicle class and vehicle identification. The phase selector alternately issues preemption requests to and withdraws preemption requests from the traffic signal controller 14, and the traffic signal controller determines whether the preemption requests can be granted. The traffic signal controller may also receive preemption requests originating from other sources, such as a nearby railroad crossing, in which case the traffic signal controller may determine that the preemption request from the other source be granted before the preemption request from the phase selector. In some implementations the function of the phase selector can be performed solely by the traffic controller.

The phase selector determines the priority of each received preemption request and whether to preempt traffic control based on the security code. For example, the ambulance 20 may be given priority over the bus 22 since a human life may be at stake. Accordingly, the ambulance 20 would transmit a preemption request with a security code indicative of a high priority while the bus 22 would transmit a preemption request with a security code indicative of a low priority. The phase selector would discriminate between the low and high priority requests and request the traffic signal controller 14 to cause the traffic signal lights 12 controlling the ambulance's approach to the intersection to remain or become green and the traffic signal lights 12 controlling the bus's approach to the intersection to remain or become red.

According to the disclosed methods and systems, the presence of phase-interruptible traffic signals at the intersection 10 can be considered in selecting and recommending a route. The intersection 10 is an example of an intersection having traffic signal lights 12 that are phase-interruptible. The signal phase can be interrupted in response to requests from ambulance 20, bus 22, or patrol motorcycle 23.

Road segments having terminal ends at the intersection can be portions of routes selected and recommended for travel, such as to the ambulance 20 and bus 22. Based on the presence of the phase-interruptible traffic signals, the estimated travel times on road segments having terminal ends on the intersection can be reduced by a correction factor. Initial estimated travel times over the road segments can be based on speed limits, congestion, etc. Because the traffic signals at the intersection are phase-interruptible, the initial estimated travel times on the road segments can be reduced. In the disclosed approaches, the initial estimated travel time over a road segment is reduced by applying a correction factor. Based on the estimated travel times over the road segments of alternative routes and any reductions made based on the presence of phase-interruptible traffic signals, the disclosed methods and systems select and display the route having the least travel time.

The phase selector 18 and traffic signals 12 can be configured for different types of phase-interruptibility, and the different types of phase-interruptibility can be used in applying correction factors to estimated travel times. For example, the traffic signals at some intersections may be configured to be interruptible only by preemption requests from emergency vehicles, and the traffic signals at other intersections may be configured to be interruptible by both preemption requests from emergency vehicles and transit signal priority requests from transit vehicles.

The disclosed methods and systems can selectively apply correction factors based on the type of the entity making a request for a recommended route and the different types of phase-interruptibility deployed at intersections along the alternative routes. If the requester type is an emergency vehicle, then a correction factor can be applied to reduce the estimated travel times on road segments having terminal ends at intersections having traffic signals that are phase-interruptible by preemption requests. Similarly, if the requester type is a transit vehicle, then a correction factor can be applied to reduce the estimated travel times on road segments having terminal ends at intersections having traffic signals that are phase-interruptible by transit signal priority requests.

The disclosed methods and systems may also be beneficial in recommending routes to pedestrians, bicyclists, and others who traveler through intersections. Many traffic signals are phase-interruptible by pedestrians, bicycles etc. At an intersection having traffic signals that are phase-interruptible by pedestrians, a pedestrian can activate a pedestrian phase by pushing a button, which is often mounted on a traffic signal post. The pressed button signals to the traffic signal controller 18 that the pedestrian wants to cross the road, and in response the traffic signal controller can adjust the timing of signal phases to allow the pedestrian to cross. Traffic signal controllers that are not phase-interruptible by pedestrians can have fixed phases during which pedestrians can cross, and pedestrians cannot alter the timing of the pedestrian crossing phases.

In selecting and recommending a route to a pedestrian, the disclosed methods and systems determine which intersections along the alternative routes have traffic signals that are phase-interruptible by pedestrians. Portions of pedestrian routes (e.g., sidewalks and walking paths) may parallel road segments, and the estimated pedestrian travel time on those portions of the routes can be referred to as being estimated travel times on the road segments (for ease of explanation). If the requester type is a pedestrian, then a correction factor can be applied to reduce the estimated travel times on road segments having terminal ends at intersections having traffic signals that are phase-interruptible by pedestrians.

Figure 2:
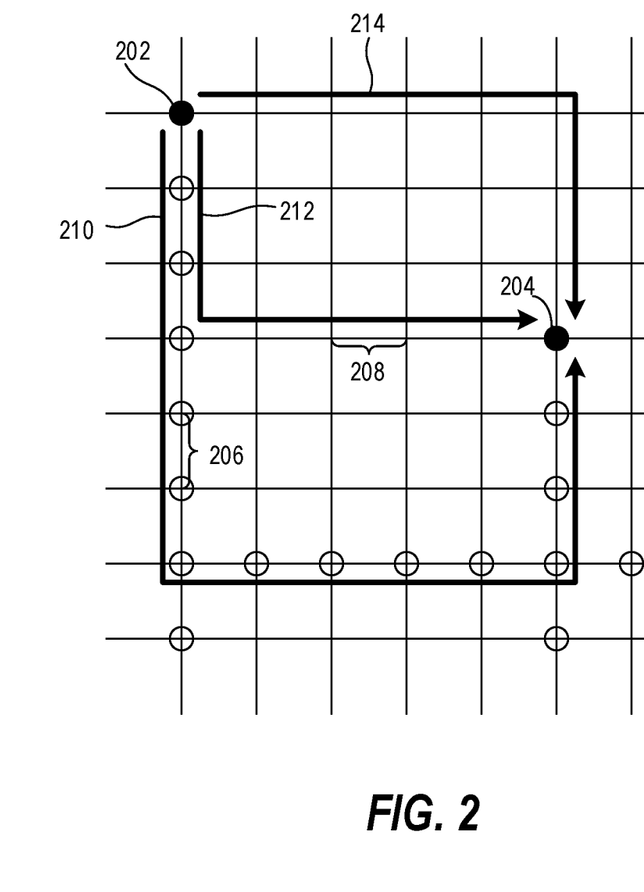
FIG. 2 shows an example of a grid of roads and three alternative routes from a source to a destination.

FIG. 2 shows an example of a grid of roads and three alternative routes from a source to a destination. The roads are shown as horizontal and vertical lines, and the source 202 and destination 204 are shown as filled circles. The points at which the lines intersect represent intersections, and unfilled circles represent phase-interruptible traffic signals at exemplary ones of the intersections. In an exemplary implementation a road segment extends from one intersection to another intersection. For example, reference numerals 206 and 208 indicate two road segments.

Directional lines 210, 212, and 214 represent three alternative routes from the source 202 to the destination 204. The disclosed methods and systems can select and recommend one of the alternative routes by applying correction factors to initial estimated travel times on road segments having terminal ends at intersections at which phase-interruptible traffic signals are disposed.

Though routes 212 and 214 have shorter distances from the source to the destination than does route 210, the availability of phase-interruptible traffic signals on the longer route 210 may enable a shorter travel time. A lesser total travel time on route 210 than on either of routes 212 and 214 can be deduced by application of correction factors to the estimated travel times on all of the road segments of route 210, application of correction factors to the estimated travel times of only three of the road segments on route 212, and no application of correction factors to the estimated travel times on any of the road segments of route 214.

Figure 3:
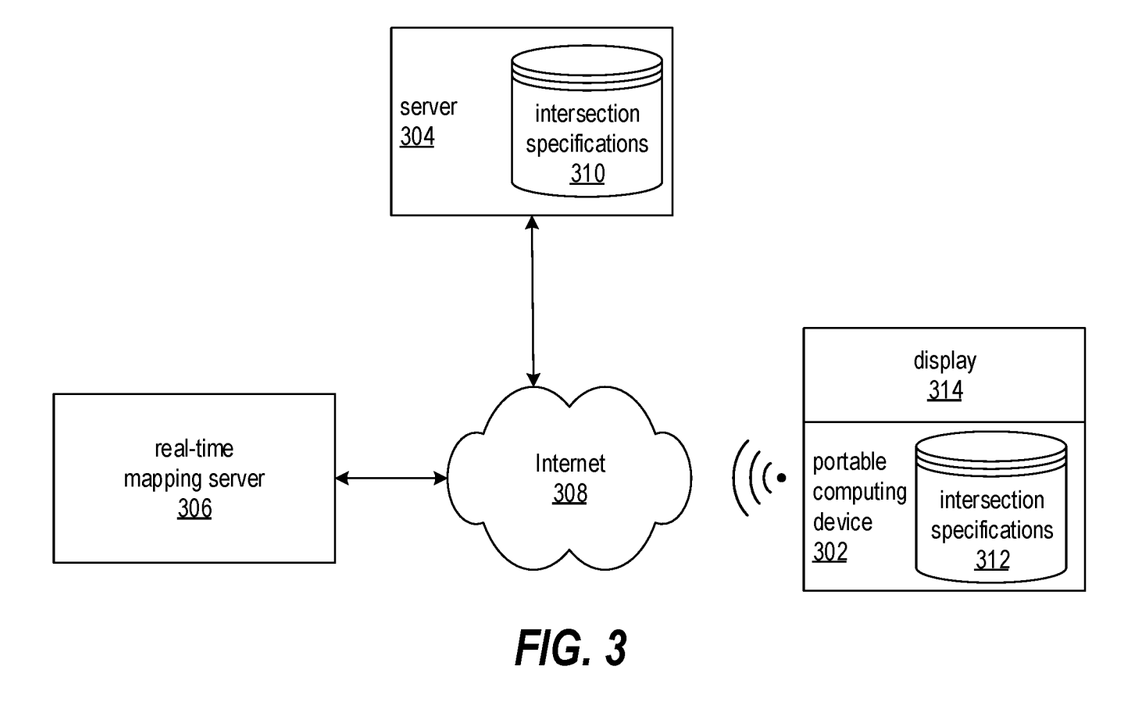
FIG. 3 shows an exemplary computing arrangement in which the disclosed methods and systems can be implemented.

FIG. 3 shows an exemplary computing arrangement in which the disclosed methods and systems can be implemented. The computing arrangement generally includes a portable computing device 302 communicatively coupled to one or more supporting server computer systems 304 and 306. The portable computing device can be operated by an entity, such as an operator of an emergency or transit vehicle or a pedestrian, to obtain a recommended route of travel from a source to a destination. The supporting server computer systems have access to the information used to determine a route to recommend. Depending on implementation requirements, either the portable computing device or the server computer systems can be configured to perform the computations that determine the recommended route. Examples of portable computing devices include, but are not limited to, laptop/notebook computers, tablets, smartphones, smartwatches, etc.

According to one approach, an application can be built to interface with a commercially available real-time mapping service, such as Waze or Google Maps, to evaluate alternative routes using supplemental information that indicates intersections having phase-interruptible traffic signals. Another source for route information that can be supplemented with information indicating phase-interruptible traffic signals is a proprietary implementation having optimized algorithms that factor-in travel time variance and reliability for routing emergency vehicles. According to another approach, a centralized mapping service comparable to commercially available services could directly access information that indicates intersections having phase-interruptible traffic signals and directly factor that information into the selection of a route to recommend. The environment shown in FIG. 3 illustrates the former approach.

Two possible implementations are illustrated in FIG. 3. In the first implementation, a central server 304 evaluates alternative routes and selects one of the routes to recommend to the portable computing device 304. In the second implementation, the portable computing device evaluates alternative routes and selects one of the routes to display. In the first implementation, an operator of an application executing on the portable computing device 302 initiates a request for a recommended route from a source to a destination. The executing application is communicatively coupled via a wireless connection and Internet 308 to a supporting application executing on the server 304. In response to the request, the supporting application on the server 304 submits a request to the real-time mapping server 306 for alternative routes from the source to the destination. The real-time mapping server determines alternative routes and transmits information describing the routes to the server 304. The information can include, for example and without limitation, a vector/shape/polyline that reflects the mapped route, alternative routes, distances, travel times, driving instructions, warnings, etc.

The server 304 can access a database 310 of intersection specifications. The database can indicate geospatial positions of intersections and for each intersection, whether or not a phase-interruptible traffic signal is present and the configuration/type of the phase-interruptible traffic signal. The configuration/type of a phase-interruptible traffic signal indicates the types of requests than can cause a change in the phase of the traffic signal, which include emergency vehicle preemption, transit signal priority, and pedestrian.

The server 304 determines which of the intersections identified in the database 310 are located on the alternative routes received from the real-time mapping server 306 based on the geospatial positions of the intersections and the information describing the alternative routes. With information describing the intersections determined to be on the alternative routes, the server can construct a graph that represents the intersections and road segments between the intersections. Vertices in the graph represent the source, destination, and intersections, and edges between vertices represent road segments having terminal ends at the source, destination, and intersections. Weights are associated with the edges and represent estimated travel times on the road segments based on data provided by the real-time mapping server. Vertices that represent intersections having phase-interruptible traffic signals can have associated correction factors.

Using the graph and correction factors to reduce the weights on edges having terminal ends at phase-interruptible intersections, the server 304 can determine which of the alternative routes would likely provide the least travel time for the requesting entity. The server can send data that describes the recommended route to the application on the portable computing device 302, and the application can display a map and the recommended route on a display device, such as the display screen 314 of a portable computing device.

Figure 4:
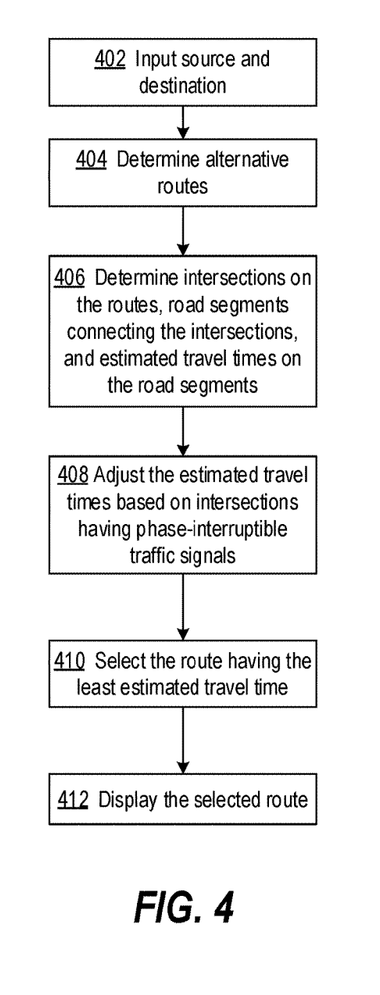
FIG. 4 shows a flowchart of an exemplary process of selecting a route from multiple alternative routes using real-time mapping data supplemented with information that indicates the locations of phase-interruptible traffic signals at intersections on the routes.

In an alternative implementation, the portable computing device 302 can perform the computational tasks described above for the server 304. The portable computing device can locally store a database 312 of intersection specifications, which can have the same information as database 310, as described above. Alternatively, the portable computing device can query server 304 for intersection data from database 310. The portable computing device can be a smart phone, tablet computer, or notebook computer, for example, and is configured to wirelessly access the Internet 308 and the server computer systems. In some implementations, the functions of server computer system 304 and 306 can be performed a single server system FIG. 4 shows a flowchart of an exemplary process of selecting a route from multiple alternative routes using real-time mapping data supplemented with information that indicates the locations of phase-interruptible traffic signals at intersections on the routes. At block 402, an application executing on a portable computing device inputs source and destination locations from a user seeking a recommendation of a route that minimizes travel time. The user can be an operator of a portable computing device, such as an emergency vehicle operator, a transit vehicle operator, or a pedestrian.

At block 404, alternative routes from the source to the destination are determined in response to the request. According to an exemplary implementation, the alternative routes can be determined by submitting a request to a generally available real-time mapping system such as Google Maps or Waze and receiving the alternative routes at an application on a central server or at an application on the portable computing device.

At block 406, a server application or application executing on the portable computing device determines intersections that are located on the alternative routes based on a database of intersection specifications. The application can then determine road segments that connect the intersections and estimated travel times on those intersections. The application can determine the estimated travel times based on the initial route information provided by the real-time mapping system or by making supplemental requests to the real-time mapping system in which the locations of intersections at terminal ends of each road segment are specified as the source and destination.

Selected ones of the estimated travel times of the road segments can be reduced at block 408 based on information indicating which intersections have phase-interruptible traffic signals. The estimated travel times can be reduced by applying a correction factor(s), for example. Application of a correction factor can be dependent on the type of the requester and the type(s) of phase-interruptibility allowed at the intersections. Requester types can include emergency requester, transit requester, and pedestrian requester. The types of type(s) of phase-interruptibility can include phase preemption, transit priority phase interruption, and pedestrian phase interruption.

According to the disclosed approaches, in order for the estimated travel time on a road segment to be reduced, the phase-interruptibility at an intersection must be allowed for the requester type. If the requester type is emergency requester, the phase-interruptibility at an intersection must allow phase preemption in order to reduce an estimated travel time on a road segment. If the requester type is transit requester, the phase-interruptibility at an intersection must allow transit priority phase interruption in order to reduce the estimated travel time on a road segment. If the requester type is pedestrian requester, the phase-interruptibility at an intersection must allow pedestrian phase interruption in order to reduce the estimated travel time on a road segment.

The application on the portable computing device 302 can be configured to indicate the type of requester to the logic that adjusts estimated travel times. If the portable computing device is deployed in an emergency vehicle, the application can be configured to signal that the requester type is emergency requester. If the portable computing device is deployed in a transit vehicle, the application can be configured to signal that the requester type is transit requester. If the portable computing device is deployed for pedestrian usage, the application can be configured to signal that the requester type is pedestrian requester.

According to one or more of the disclosed approaches, different correction factors can be associated with different types of phase-interruptibility. For example a correction factor associated with phase preemption can reduce an estimated travel time more than a correction factor associated with transit priority phase interruption, and a correction factor associated with transit priority phase interruption can reduce an estimated travel time more than a correction factor associated with pedestrian phase interruption. Different correction factors can also be associated with different levels of preemption and priority, such as different correction factors for minimal, basic, and aggressive preemption, and different correction factors for minimal, basic, and aggressive priority. The different correction factors can aid in more accurately representing side streets or paths that go against typical traffic coordination.

According to one or more of the disclosed approaches, different correction factors for the same type of phase-interruptibility can be associated with different intersections. For example, if first and second intersections both allow phase preemption, the first intersection can have a different correction factor associated with phase preemption than the correction factor associated with the second intersection for phase preemption.

At block 410, the application (server or portable computing device) can select the route having the least estimated travel time after adjustments have been made based on the locations and qualifications of phase-interruptible traffic signals. In some implementations, the real-time mapping system can provide the number of routes (e.g., 3 or 4 routes) that are feasible for display on the portable computing device. In other implementations, the real-time mapping system can provide more routes than are feasible or desirable for display on the portable computing device. In implementations in which the real-time mapping system provides more routes than are to be displayed, the application can select a subset of the possible routes having least estimated travel times. In configurations in which a central server adjusts and selects one or more routes, the central server can communicate to the portable computing device, information that describes the selected one or more routes. The information can indicate the route that has the least estimated travel time.

The application executing on the portable computing device displays the selected route(s) on a display screen at block 412. The route having the least estimated travel time can be highlighted on the display screen, or some other visual indication can be used to enable quick identification. Alternative routes and associated estimated travel times can also be displayed. The display of alternative routes can be consistent with and/or comparable to features of the partial map illustrated in FIG. 2.

Figure 5:
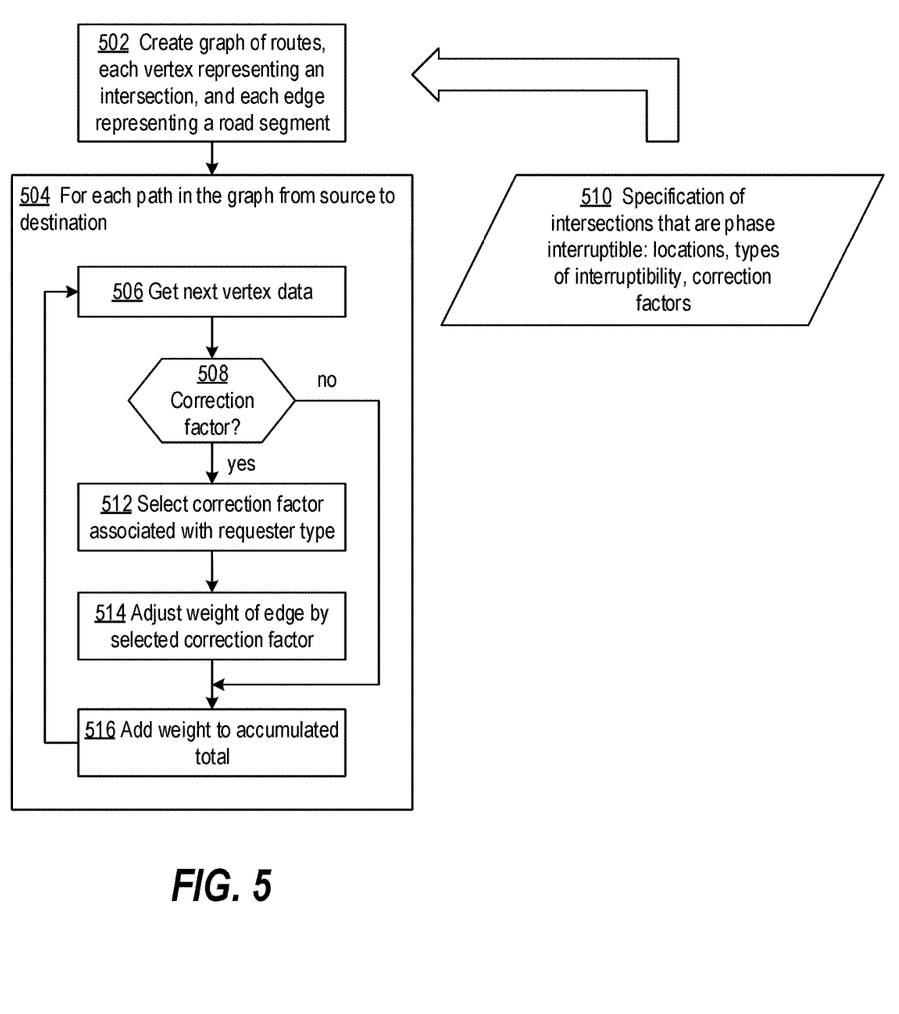
FIG. 5 shows a flowchart of an exemplary process that further explains processing of parts of FIG. 4.

FIG. 5 shows a flowchart of an exemplary process that further explains blocks 406 and 408 of FIG. 4. At block 502, the processor executing the application creates a graph of alternative routes in a data structure in a memory. The graph can be constructed using information returned from a real-time mapping system and describing alternative routes from a source to a destination. The data from the can be combined with data 510 that specify locations of intersections having phase-interruptible traffic signals, types of phase-interruptibility, and correction factors associated with the intersections having phase-interruptible traffic signals.

The graph has vertices that are connected by edges, with each vertex representing an intersection, and each edge representing a road segment having terminal ends at two intersections. The graph also has two vertices that represent the source and destination, respectively.

Information associated with the edges and vertices supports reducing estimated travel times on various road segments and determining the route having the least overall estimated travel time. The edges can have associated weights that are proportional to and represent the estimated travel times, respectively. Alternatively, the weights can be values of the actual estimated travel times.

Each vertex can have associated data indicating whether or not phase-interruptible traffic signals are present at the represented intersection, one or more types of phase-interruptibility, and one or more associated correction factors. The one or more types of phase-interruptibility can be emergency preemption, transit priority phase interruption, and pedestrian interruption. The one or more associated correction factors can be a single correction factor that can be used for all types of phase-interruptibility. Alternatively, different correction factors can be used for the different types of phase-interruptibility. In one implementation, the correction factor can be a fraction less than one that can be multiplied by the weight on an edge. In an alternative implementation, the correction factor can be a value that is added to (a negative value) or subtracted from (a positive value) the weight on an edge. Correction factors that are subtracted from edge weights may provide better results, because the edge weights can vary significantly for segments having different lengths.

At block 504, the processor evaluates the possible paths from the source vertex to the destination vertex in the graph by performing the operations of blocks 506, 508, 512, 514, and 516. The process of block 504 can implement a shortest path algorithm, such as Dijkstra's algorithm or Bellman Ford's algorithm. The processing shown by blocks 506, 508, 512, 514, and 516 can be applied to the shortest path chosen for the implementation.

At block 506, the processor gets the vertex data of the next vertex on the path. Decision block 508 tests whether or not the vertex data indicates that phase-interruptible traffic signals are present at the represented intersection. If the vertex data indicates that no phase-interruptible traffic signals are present at the represented intersection, the processing of blocks 512 and 514 is bypassed, and the weight associated with the inbound edge to the vertex is added to the accumulated total estimated time of the path at block 516.

If the vertex data indicates that phase-interruptible traffic signals are present at the represented intersection, the processor can determine if the type of phase-interruptibility provided at the intersection is available to the requester type. For example, if the requester type is emergency requester and the type of phase-interruptibility is emergency preemption, or if the requester type is transit requester and the type of phase-interruptibility is transit phase interruption, or if the requester type is pedestrian requester and the type of phase-interruptibility is pedestrian phase interruption, then the processor proceeds to block 512.

At block 512, the processor obtains a correction factor. If different correction factors are provided for different requester types, the processor uses the requester type indicated by the application on the portable computing device to select the correction factor associated with that requester type. At block 514, the processor adjusts the weight on the inbound edge by the selected correction factor. If the correction factor is implemented as a fraction less than one, the weight can be multiplied by the correction factor. Alternatively, the correction factor can be a negative value that is summed with the weight or a positive value that is subtracted from the weight.

At block 516, the weight, as adjusted by the correction factor or the unadjusted weight of the inbound edge if phase-interruptibility unavailable for the requester type at the intersection, is added to the total accumulated weight for the path. The processing of blocks 506, 508, 512, 514, and 516 is repeated for all the vertices on a path.

Figure 6:
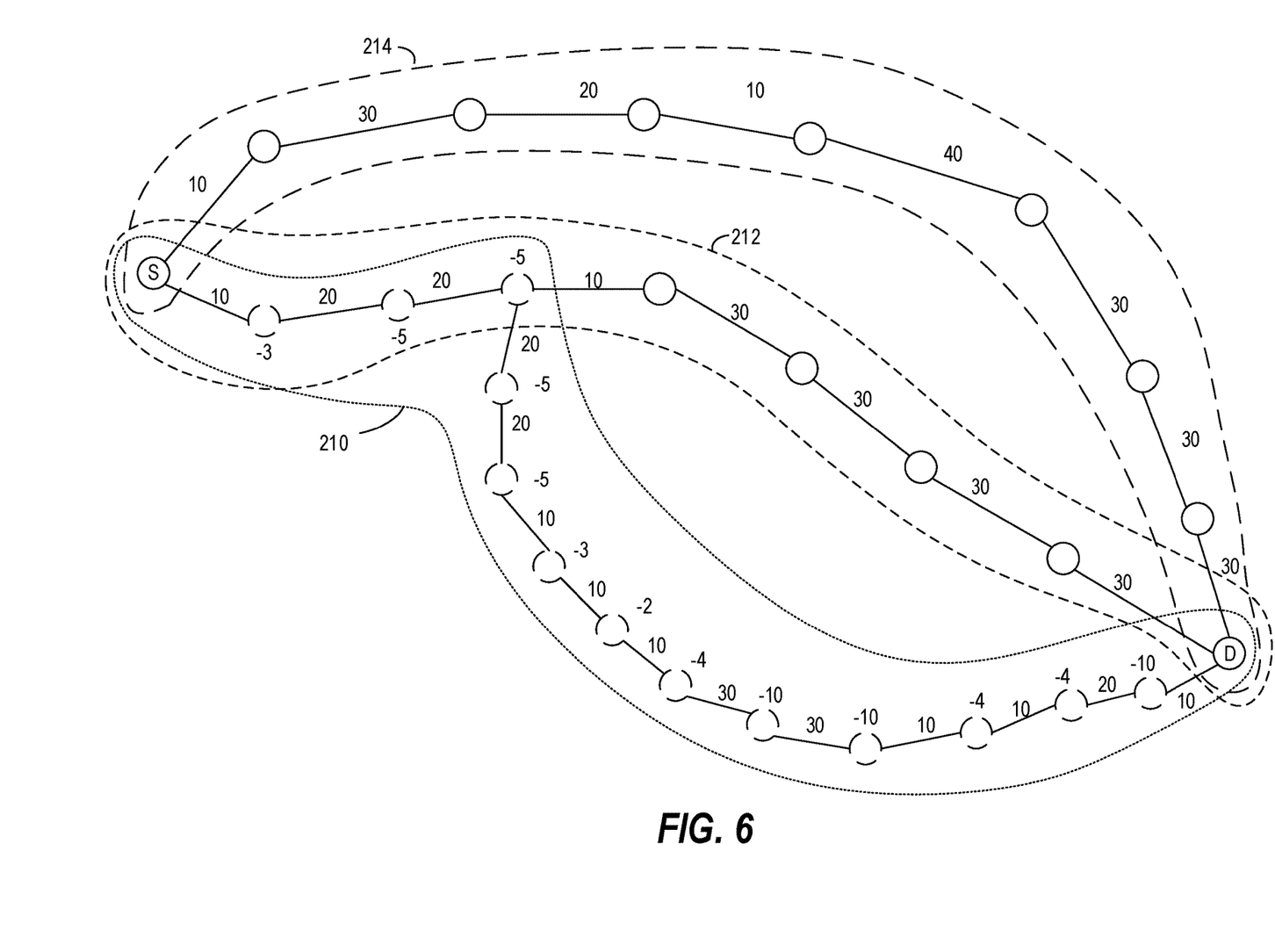
FIG. 6 shows a graph generated for the example routes of FIG. 2.

FIG. 6 shows a graph generated for the example routes 210, 212, and 214 of FIG. 2. The vertex labeled "S" is the source, and the vertex labeled "D" is the destination. The weight of each of the edges is adjacent to the edge, and intersections having phase-interruptible traffic signals are represented by vertices having adjacent correction factors. The weights represent relative estimated travel times and can, but do not necessarily have to, indicate actual quantities of time.

Application of the disclosed methods to the paths representing routes 210, 212, and 214, shows that the total estimated travel time on route 210 is less than the total estimated travel times on routes 212 and 214. According to the example, the correction factors on the vertices can vary based on traffic signal timing, such as minimal preemption, basic preemption, or aggressive preemption. The weight on an edge can be summed with the correction factor on the next vertex of the route. The total travel times are as follows:

Route 210 travel time=(10−3)+(20−5)+(20−5)+(20−5)+(20−5)+(10−3)+(10−2)+(10−4)+(30−10)+(30−10)+(10−4)+(10−4)+(20−10)+10=160.

Route 212 travel time=(10−3)+(20−5)+(20−5)+10+30+30+30+30=167.

Route 214 travel time=10+30+20+10+40+30+30+30=200.

Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

The present invention is thought to be applicable to a variety of systems for a selecting a route. Other aspects and embodiments of the present invention will be apparent to those skilled in the art from consideration of the specification and practice of the invention disclosed herein. It is intended that the specification and illustrated embodiments be considered as examples only, with a true scope of the invention being indicated by the following claims.

What is claimed is:
1. A method, comprising:
submitting a request for real-time mapping data to a real-time mapping server by a computing arrangement in response to a request to the computing arrangement for a recommended route from a source to a destination;
receiving the real-time mapping data by the computing arrangement, wherein the real-time mapping data describe a plurality of different routes from the source to the destination, and each route is defined by a set of road segments, a set of intersections, and data indicative of first estimated travel times on the road segments, respectively;
determining ones of the intersections having traffic signals that are phase-interruptible by the computing arrangement;
reducing by the computing arrangement, for one or more road segments of the different routes that connect to one or more intersections having phase-interruptible traffic signals, the first estimated travel times based on one or more correction factors;
determining by the computing arrangement, second estimated travel times of the different routes as a function of the first estimated travel times of the road segments and each reduction of the first estimated travel times; and displaying one or more routes of the different routes on a display device, the displaying including providing a visual indication of one route of the one or more routes having a second estimated travel time that is less than the second estimated travel time of every other route of the one or more routes.

2. The method of claim 1, wherein the reducing includes:
determining a requester type of an entity making the request for the recommended route;
determining ones of the intersections having traffic signals that are phase-interruptible by preemption in response to the requester type being an emergency vehicle; and
reducing the first estimated travel times based on the one or more correction factors, for one or more road segments of the different routes that connect to one or more intersections determined to be phase-interruptible by preemption.

3. The method of claim 1, wherein the reducing includes:
determining a requester type of an entity making the request for the recommended route;
determining ones of the intersections having traffic signals that are phase-interruptible by transit signal priority in response to the requester type being a transit vehicle; and
reducing the first estimated travel times based on the one or more correction factors, for one or more road segments of the different routes that connect to one or more intersections determined to be phase-interruptible by transit signal priority.

4. The method of claim 1, wherein the reducing includes:
determining a requester type of an entity making the request for the recommended route;
determining ones of the intersections having traffic signals that are phase-interruptible by pedestrians in response to the requester type being a pedestrian; and
reducing the first estimated travel times based on the one or more correction factors, for one or more road segments of the different routes that connect to one or more intersections determined to be phase-interruptible by pedestrians.

5. The method of claim 1, wherein the reducing includes:
determining a requester type of an entity making the request for the recommended route; and
in response to the requester type being an emergency vehicle:
  determining ones of the intersections having traffic signals that are phase-interruptible by preemption, and
  reducing the first estimated travel times based on the one or more correction factors, for one or more road segments of the different routes that connect to one or more intersections determined to be phase-interruptible by preemption;
in response to the requester type being a transit vehicle:
  determining ones of the intersections having traffic signals that are phase-interruptible by transit signal priority, and
  reducing the first estimated travel times based on the one or more correction factors, for one or more road segments of the different routes that connect to one or more intersections determined to be phase-interruptible by transit signal priority.

6. The method of claim 1, wherein the reducing includes:
determining a requester type of an entity making the request for the recommended route; and
in response to the requester type being an emergency vehicle:
  determining ones of the intersections having traffic signals that are phase-interruptible by preemption, and
  reducing the first estimated travel times based on a first correction factor of the one or more correction factors, for one or more road segments of the different routes that connect to one or more intersections determined to be phase-interruptible by preemption;
in response to the requester type being a transit vehicle:
  determining ones of the intersections having traffic signals that are phase-interruptible by transit signal priority, and
  reducing the first estimated travel times based on a second correction factor that is one of the one or more correction factors and is different from the first correction factor, for one or more road segments of the different routes that connect to one or more intersections determined to be phase-interruptible by transit signal priority.

7. The method of claim 1, wherein the reducing includes reducing the first estimated travel times based on a respective correction factors associated with the intersections.

8. The method of claim 1, further comprising selecting the one or more routes by the computing arrangement, the one or more routes having least ones of the second estimated travel times of the different routes.

9. The method of claim 1, wherein the displaying the one or more routes includes displaying each second estimated travel time of each of the one or more routes.

10. A system, comprising:
a portable computing device having one or more processors and a memory configured with program instructions that when executed cause the one or more processors to perform operations including:
  submitting a request for real-time mapping data to a real-time mapping server in response to a request for a recommended route from a source to a destination;
  receiving the real-time mapping data, wherein the real-time mapping data describe a plurality of different routes from the source to the destination, and each route is defined by a set of road segments, a set of intersections, and data indicative of first estimated travel times on the road segments, respectively;
  determining ones of the intersections having traffic signals that are phase-interruptible;
  reducing for one or more road segments of the different routes that connect to the ones of the intersections having phase-interruptible traffic signals, the first respective estimated travel times based on one or more correction factors;
  determining second estimated travel times of the different routes as a function of the first respective estimated travel times of the road segments and each reduction of the first estimated travel times; and
  displaying one or more of the different routes on a display device, the displaying including providing a visual indication of one route of the one or more routes having a second estimated travel time that is less than the second estimated travel time of every other route of the one or more routes.

11. The system of claim 10, wherein the instructions for reducing include instructions for:
determining a requester type of an entity making the request for the recommended route;

determining ones of the intersections having traffic signals that are phase-interruptible by preemption in response to the requester type being an emergency vehicle; and
reducing the first estimated travel times based on the one or more correction factors, for one or more road segments of the different routes that connect to one or more intersections determined to be phase-interruptible by preemption.

12. The system of claim 10, wherein the instructions for reducing include instructions for:
determining a requester type of an entity making the request for the recommended route;
determining ones of the intersections having traffic signals that are phase-interruptible by transit signal priority in response to the requester type being a transit vehicle; and
reducing the first estimated travel times based on the one or more correction factors, for one or more road segments of the different routes that connect to one or more intersections determined to be phase-interruptible by transit signal priority.

13. The system of claim 10, wherein the instructions for reducing include instructions for:
determining a requester type of an entity making the request for the recommended route;
determining ones of the intersections having traffic signals that are phase-interruptible by pedestrians in response to the requester type being a pedestrian; and
reducing the first estimated travel times based on the one or more correction factors, for one or more road segments of the different routes that connect to one or more intersections determined to be phase-interruptible by pedestrians.

14. The system of claim 10, wherein the instructions for reducing include instructions for:
determining a requester type of an entity making the request for the recommended route; and
in response to the requester type being an emergency vehicle:
determining ones of the intersections having traffic signals that are phase-interruptible by preemption, and
reducing the first estimated travel times based on the one or more correction factors, for one or more road segments of the different routes that connect to one or more intersections determined to be phase-interruptible by preemption in response to the requester type being a transit vehicle:
determining ones of the intersections having traffic signals that are phase-interruptible by transit signal priority, and
reducing the first estimated travel times based on the one or more correction factors, for one or more road segments of the different routes that connect to one or more intersections determined to be phase-interruptible by transit signal priority.

15. The system of claim 10, wherein the instructions for reducing include instructions for:
determining a requester type of an entity making the request for the recommended route; and
in response to the requester type being an emergency vehicle:
determining ones of the intersections having traffic signals that are phase-interruptible by preemption, and
reducing the first estimated travel times based on a first correction factor of the one or more correction factors, for one or more road segments of the different routes that connect to one or more intersections determined to be phase-interruptible by preemption;
in response to the requester type being a transit vehicle:
determining ones of the intersections having traffic signals that are phase-interruptible by transit signal priority, and
reducing the first estimated travel times based on a second correction factor that is one of the one or more correction factors and is different from the first correction factor, for one or more road segments of the different routes that connect to one or more intersections determined to be phase-interruptible by transit signal priority.

16. The system of claim 10, wherein the instructions for reducing include instructions for reducing the first estimated travel times based on a respective correction factors associated with the intersections.

17. The system of claim 10, wherein the memory is configured with instructions that when executed cause the one or more processors to select the one or more routes of the different routes, the one or more routes having least ones of the second estimated travel times.

18. The system of claim 10, wherein the instructions for displaying the one or more routes include instructions for displaying each second estimated travel time of each of the one or more routes.

19. A system, comprising:
a server having one or more processors and a memory configured with program instructions that when executed cause the one or more processors to perform operations including:
receiving from a communicatively coupled portable computing device, a request for directions from a source to a destination;
submitting a request to a real-time mapping server for real-time mapping data from the source to the destination;
receiving the real-time mapping data, wherein the real-time mapping data describe a plurality of different routes from the source to the destination, and each route is defined by a set of road segments, a set of intersections, and data indicative of first estimated travel times on the road segments, respectively;
determining ones of the intersections having traffic signals that are phase-interruptible;
reducing for one or more road segments of the different routes that connect to the ones of the intersections having phase-interruptible traffic signals, the first respective estimated travel times based on one or more correction factors;
determining second estimated travel times of the different routes as a function of the first respective estimated travel times of the road segments and each reduction of the first estimated travel times; and
communicating to the portable computing device, information that describes one or more routes of the different routes for display on a display device and that indicates one route of the one or more routes having a second estimated travel time that is less than the second estimated travel time of every other route of the one or more routes.

20. The system of claim 19, wherein the instructions for reducing include instructions for:
determining a requester type of an entity making the request for directions;

determining ones of the intersections having traffic signals that are phase-interruptible by preemption in response to the requester type being an emergency vehicle; and reducing the first estimated travel times based on the one or more correction factors, for one or more road segments of the different routes that connect to one or more intersections determined to be phase-interruptible by preemption.

21. The system of claim 19, wherein the instructions for reducing include instructions for:

determining a requester type of an entity making the request for directions;

determining ones of the intersections having traffic signals that are phase-interruptible by transit signal priority in response to the requester type being a transit vehicle; and reducing the first estimated travel times based on the one or more correction factors, for one or more road segments of the different routes that connect to one or more intersections determined to be phase-interruptible by transit signal priority.

22. The system of claim 19, wherein the instructions for reducing include instructions for:

determining a requester type of an entity making the request for directions;

determining ones of the intersections having traffic signals that are phase-interruptible by pedestrians in response to the requester type being a pedestrian; and reducing the first estimated travel times based on the one or more correction factors, for one or more road segments of the different routes that connect to one or more intersections determined to be phase-interruptible by pedestrians.

23. The system of claim 19, wherein the instructions for reducing include instructions for:

determining a requester type of an entity making the request for directions; and in response to the requester type being an emergency vehicle:

determining ones of the intersections having traffic signals that are phase-interruptible by preemption, and reducing the first estimated travel times based on the one or more correction factors, for one or more road segments of the different routes that connect to one or more intersections determined to be phase-interruptible by preemption in response to the requester type being a transit vehicle:

determining ones of the intersections having traffic signals that are phase-interruptible by transit signal priority, and reducing the first estimated travel times based on the one or more correction factors, for one or more road segments of the different routes that connect to one or more intersections determined to be phase-interruptible by transit signal priority.

24. The system of claim 19, wherein the instructions for reducing include instructions for:

determining a requester type of an entity making the request for directions; and in response to the requester type being an emergency vehicle:

determining ones of the intersections having traffic signals that are phase-interruptible by preemption, and reducing the first estimated travel times based on a first correction factor of the one or more correction factors, for one or more road segments of the different routes that connect to one or more intersections determined to be phase-interruptible by preemption;

in response to the requester type being a transit vehicle:

determining ones of the intersections having traffic signals that are phase-interruptible by transit signal priority, and reducing the first estimated travel times based on a second correction factor that is one of the one or more correction factors and is different from the first correction factor, for one or more road segments of the different routes that connect to one or more intersections determined to be phase-interruptible by transit signal priority.

25. The system of claim 19, wherein the instructions for reducing include instructions for reducing the first estimated travel times based on a respective correction factors associated with the intersections.

26. The system of claim 19, wherein the memory is configured with instructions that when executed cause the one or more processors to select the one or more routes of the different routes, the one or more routes having least ones of the second estimated travel times.

* * * * *